United States Patent [19]

Black

[11] Patent Number: 4,759,097
[45] Date of Patent: Jul. 26, 1988

[54] WHEEL BRACKET ASSEMBLY HAVING TWO PART WHEEL BRACKET AND A METHOD OF MAKING THE WHEEL BRACKET ASSEMBLY

[75] Inventor: John W. Black, Hickory Corners, Mich.

[73] Assignee: Standex International Corporation, Salem, N.H.

[21] Appl. No.: 38,409

[22] Filed: Apr. 10, 1987

Related U.S. Application Data

[63] Continuation of Ser. No. 867,638, May 23, 1986, abandoned, which is a continuation of Ser. No. 795,703, Nov. 6, 1985, abandoned, which is a continuation of Ser. No. 488,863, Apr. 26, 1983, abandoned.

[51] Int. Cl.$^4$ ............................................. B60B 33/00
[52] U.S. Cl. ........................... 16/18 CG; 16/31 R; 16/43; 16/44; 16/46; 16/DIG. 27; 16/DIG. 42
[58] Field of Search ............... 16/18 R, 18 CG, 19, 16/29, 31 R, 31 A, 32, 33, 42 R, 42 T, 43–48, DIG. 27, DIG. 42; 29/463, 525; 384/474

[56] References Cited

U.S. PATENT DOCUMENTS

| | | | |
|---|---|---|---|
| Re. 31,110 | 12/1982 | Black | 16/46 |
| 568,025 | 9/1896 | Graessle | 16/31 R |
| 1,836,246 | 12/1931 | Herold . | |
| 1,899,394 | 2/1933 | Noelting | 16/19 X |
| 1,929,743 | 10/1933 | Jarvis et al. | 16/44 X |
| 2,184,038 | 12/1939 | Dayton | 16/31 R X |
| 2,744,800 | 5/1956 | Black, Jr. . | |
| 2,747,950 | 5/1956 | Black, Jr. . | |
| 2,834,608 | 5/1958 | Wixson | 16/32 X |
| 2,937,059 | 5/1960 | Anderson et al. | 384/474 |
| 2,973,546 | 3/1961 | Roché16 | 43/ |
| 2,987,752 | 6/1961 | Black . | |
| 3,210,795 | 10/1965 | Fontana et al. | 16/43 |
| 3,899,226 | 8/1975 | Frost et al. . | |
| 3,988,800 | 11/1976 | Sachser | 16/43 X |
| 4,122,580 | 10/1978 | Black | 16/46 |
| 4,318,204 | 3/1982 | Black | 16/46 |

FOREIGN PATENT DOCUMENTS

| | | | |
|---|---|---|---|
| 52984 | 6/1982 | European Pat. Off. . | |
| 2120419 | 9/1972 | Fed. Rep. of Germany | 16/45 |
| 1309019 | 10/1962 | France . | |
| 1312550 | 11/1962 | France . | |
| 2174598 | 10/1973 | France . | |
| 1677 | of 1880 | United Kingdom | 16/18 R |

Primary Examiner—Fred Silverberg
Attorney, Agent, or Firm—Flynn, Thiel, Boutell & Tanis

[57] ABSTRACT

A wheel bracket assembly includes two separate, plate-like bracket parts which each have a noncircular opening therein and are disposed on opposite sides of a wheel in angular alignment. The ends of the axle for the wheel extend through the noncircular openings and the bracket parts are fixed against axial and rotational movement with respect to the axle. A method of making the wheel bracket assembly includes the steps of stamping out from at least one metal plate the two bracket parts which are substantially mirror images of each other and have the noncircular opening therethrough, placing the bracket parts in angular alignment on opposite sides of the wheel so that the ends of the axle extend through the noncircular openings, and upsetting each end of the axle to retain the bracket parts in place and so that the material of the axle flows to fill the noncircular openings in the bracket parts and thereby prevent relative rotation of the bracket parts.

32 Claims, 4 Drawing Sheets

WHEEL BRACKET ASSEMBLY HAVING TWO PART WHEEL BRACKET AND A METHOD OF MAKING THE WHEEL BRACKET ASSEMBLY

This application is a continuation of U.S. Ser. No. 867,638 filed May 23, 1986 and now abandoned, which was a continuation of U.S. Ser. No. 795,703, filed Nov. 6, 1985 and now abandoned, which was in turn a continuation of U.S. Ser. No. 488,863, filed Apr. 26, 1983 and now abandoned.

FIELD OF THE INVENTION

This invention relates to a wheel bracket assembly and a method for making it, and more particularly to a wheel bracket assembly having two bracket parts which are mirror images of each other and are preferably made by a single stamping step.

BACKGROUND OF THE INVENTION

Wheel bracket assemblies, which include a wheel bracket and a wheel rotatably supported on the bracket, are utilized in many applications, for example on shopping carts. In applications of this type, the wheel bracket assembly is frequently subjected to rough treatment and therefore must be durable and reliable. However, in industries which are highly competitive, it is also important that the wheel bracket assembly be relatively inexpensive in order to minimize the overall cost of the final product.

Figure 14:
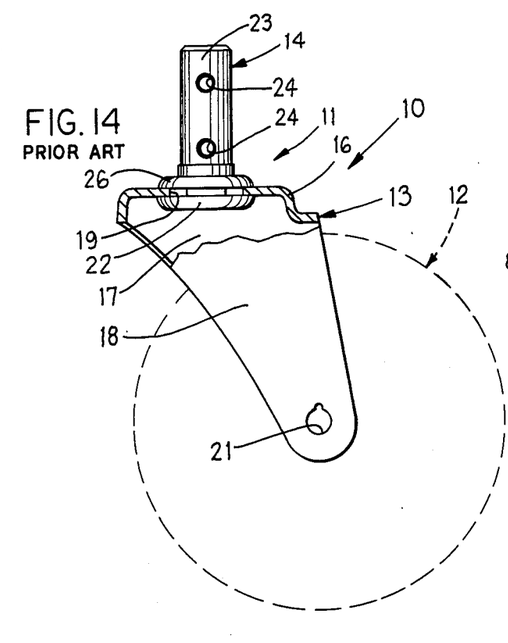
FIG. 14 is a fragmentary elevational side view of a conventional wheel bracket assembly with the wheel shown only in broken lines.

One conventional wheel bracket assembly used in applications of this type includes a U-shaped horn with the wheel rotatably supported between its legs, and a pin which is riveted in an opening in the bight of the horn and has transverse holes drilled therethrough (see FIG. 14). Although this conventional arrangement has been adequate for its intended purposes, it has not been satisfactory in all respects. In particular, several separate manufacturing steps are required to fabricate the wheel bracket, thus making the wheel bracket assembly relatively expensive. Further, the connection between the pin and horn is subjected to relatively large stresses and frequently tends to loosen over a period of time.

A further consideration is that it is usually desirable for a wheel bracket assembly of the foregoing type to have a small amount of pivoting and shock-absorbing capability when mounted on a shopping cart or other device, in order to minimize the stresses applied to the bearings. However, conventional arrangements which provide limited pivoting and/or shock-absorbing capability typically involve increased structural complexity of the wheel bracket assembly and thus an increased number of manufacturing steps to fabricate the wheel bracket assembly.

A further consideration is that, although the bearing in wheel bracket assemblies of the foregoing type are typically designed so that the lubrication applied to the bearings at the factory will last the useful lifetime of the device, situations sometimes arise in which additional lubrication is necessary. In conventional wheel bracket assemblies, further lubrication has typically required that the wheel bracket assembly be disassembled, the wheel lubricated, and the wheel bracket assembly then reassembled. This is a relatively expensive procedure, and its cost can frequently approach or exceed the cost of a new wheel bracket assembly thus making relubrication economically impractical.

Accordingly, an object of the present invention is to provide a wheel bracket assembly which is simple in structure and is relatively simple and inexpensive to manufacture.

A further object of the invention is to provide a wheel bracket assembly, as aforesaid, which can be fabricated with a minimum number of steps and with a minimal amount of labor.

A further object of the invention is to provide a wheel bracket assembly, as aforesaid, which is rugged and durable and requires no maintenance over its useful lifetime.

A further object of the invention is to provide a wheel bracket assembly, as aforesaid, which has an aesthetically pleasing appearance and preferably a somewhat streamlined shape.

A further object of the invention is to provide a wheel bracket assembly, as aforesaid, which has a small amount of pivoting and/or shock-absorbing capability when mounted on a shopping cart or similar vehicle.

A further object of the invention is to provide a wheel bracket assembly, as aforesaid, which includes a structurally simple arrangement for gaining access to the sealed bearing of the wheel in order to facilitate lubrication of the bearing in the unlikely event that lubrication should become necessary at some time during the useful life of the bearing.

SUMMARY OF THE INVENTION

The objects and purposes of the invention, including those set forth above, are met by providing a wheel bracket assembly which includes two separate, platelike bracket parts, each having a noncircular opening therein, and an axle and a wheel rotatably supported on the axle. The bracket parts are disposed on opposite sides of the wheel and each end of the axle extends through the noncircular opening in a respective one of the bracket parts. The bracket parts are angularly aligned and fixed against axial and pivotal movement relative to the axle.

In a preferred embodiment, the bracket parts are substantially mirror images of each other and each have a stem portion which is substantially semicylindrical, the stem portions being adjacent and forming a substantially cylindrical tube when the two bracket parts are placed in a mirror image relationship. The bracket parts also have central regions at one end of the stem portions which, when the bracket parts are in the mirror image relationship, diverge outwardly away from each other in a direction away from the stem portions and merge into respective further regions which are spaced, extend substantially parallel to each other, and have the noncircular opening therein. An annular sleeve or grommet preferably is provided on and snugly surrounds the tube defined by the stem portions.

The inventive method of making a wheel bracket assembly includes the steps of stamping out from at least one metal plate two separate bracket parts which are substantially mirror images of each other and each have a noncircular opening therethrough, providing an axle having a wheel rotatably supported thereon, placing the bracket parts in mirror image relationship and in angular alignment on opposite sides of the wheel so that each end of the axle extends through the noncircular opening in a respective bracket part, and upsetting each end of the axle to retain the bracket parts in place and so that the material of the axle flows to fill the noncircular openings in the bracket parts, thereby preventing relative rotation of the bracket parts about the axle and maintaining the bracket parts in angular alignment.

Each bracket part preferably includes a semicylindrical stem portion which has an opening therein, and a central region which flares outwardly from one end of the stem portion and merges into a further region which has the noncircular opening therein. The stem portions are preferably adjacent and define a tubular stem in the assembled device, and the inventive method can include the step of placing onto the stem an annular member which snugly surrounds it. According to a preferred form of the inventive method, both bracket parts are fabricated in their entirety by a single stamping operation.

BRIEF DESCRIPTION OF THE DRAWINGS

The subject matter of the invention will be discussed in more detail hereinafter in connection with the exemplary embodiment illustrated in the drawings, in which.

Certain terminology is used in the following description for convenience in reference only and is not to be considered limiting. For example, the words "up", "down", "front" and "rear" will designate directions in the drawings to which reference is made. The words "in" and "out" will respectively refer to directions toward and away from the geometric center of the wheel bracket assembly and designated parts thereof. Such terminology will include the words specifically mentioned above, derivatives thereof and words of similar import.

DETAILED DESCRIPTION

A wheel bracket assembly 10 of conventional construction is illustrated in FIG. 14. It includes a wheel bracket 11 which can rotatably support a wheel 12. The wheel bracket 11 includes a horn 13 which is made from a single piece of sheet metal bent to substantially a U-shape and has a bight 16 and two spaced, parallel legs 17 and 18. A hexagonal opening 19 is provided through the bight 16, and the legs 17 and 18 each have an opening 21 therethrough adjacent the lower end thereof. A pin 14 has a cylindrical shank 23 which extends through the opening 19 in the bight 16 and has a head 22 disposed against the undersurface of the bight 16. An upset 26 retains the pin 14 in place and is produced by shearing material from the pin 14. This shearing step causes the material of the pin 14 to flow to fill the hexagonal opening 19 and thereby prevent rotation of the pin 14 relative to the horn 13. Two vertically spaced transverse openings 24 are provided through the shank 23 of the pin 14.

Fabrication of the wheel bracket assembly 10 of FIG. 14 requires a number of separate steps. More specifically, the pin 14 must be fabricated with the circular shank 23 and the head 22, and then the openings 24 must be drilled through the shank 23. The horn 13 must be stamped from a piece of metal, and must then be placed in a device which bends it to a U-shape. Thereafter, the pin must be inserted through the hexagonal opening 19, and material must then be sheared from the shank 23 to create the upset 26. Then, a wheel must be placed between the legs 17 and 18 with its axle received in the openings 21, and then one or both ends of the axle must be upset to secure it in position.

The wheel bracket assembly 10 of FIG. 14 is thus relatively complex and expensive to manufacture. Moreover, the connection between the horn 13 and pin 14 is frequently subject to relatively large stresses during use and may tend to become loose over a period of time.

Figures 1, 2, 6:
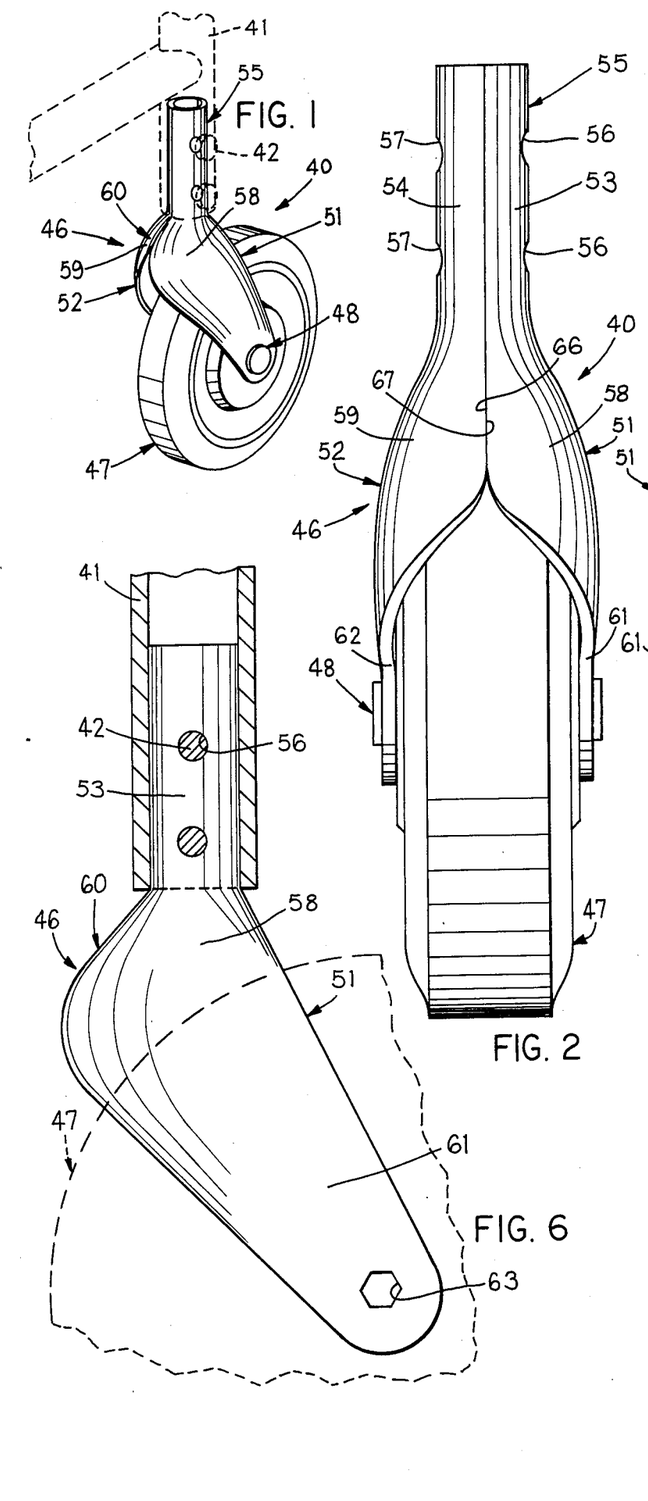
FIG. 1 is a perspective view of a wheel bracket assembly embodying the invention.
FIG. 2 is a front elevational view of the wheel bracket assembly of FIG. 1.
FIG. 6 is an elevational side view of the wheel bracket assembly of FIG. 1 with the wheel and axle omitted and a tubular leg of a shopping cart shown in section.

An improved wheel bracket assembly embodying the present invention is illustrated in FIG. 1 and designated by reference numeral 40. The wheel bracket assembly 40 is shown in a typical application, namely, secured to a tubular rear leg 41 of a shopping cart frame by rivets or pins 42.

The wheel bracket assembly 40 includes a wheel bracket 46 and a wheel 47 which is rotatably supported on the wheel bracket 46 by means of an axle 48. The wheel 47 and axle 48 are discussed in greater detail hereinafter.

The wheel bracket 46 consists of two wheel bracket parts 51 and 52 which are mirror images of each other and are each made from a metal plate.

As shown in FIGS. 2 to 5, a respective stem portion 53 or 54 is provided at the upper end of each of the bracket parts 51 and 52. The stem portions 53 and 54 are each elongate, of uniform width, and bent to a substantially semicylindrical shape. The stem portion 53 has two vertically spaced openings 56 therethrough, and the stem portion 54 has corresponding openings 57 therethrough.

Figure 4:
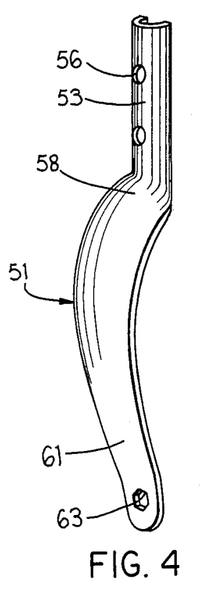
FIG. 4 is a perspective view of a bracket part which is a component of the wheel bracket assembly of FIG. 1.
Figure 5:
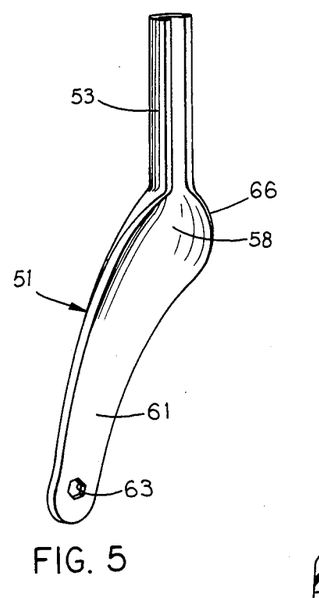
FIG. 5 is a different perspective view of the bracket part of FIG. 4.

Each of the bracket parts 51 and 52 has a respective central region 58 or 59 which flares downwardly and outwardly from the lower end of the associated stem portion, is curved somewhat, and increases in width in a direction away from the stem portion.

The central regions 58 and 59 each merge into a respective lower region 61 or 62 which extends substantially vertically downwardly, is substantially flat, and tapers in width in a downward direction. A respective noncircular opening 63 or 64 (FIGS. 6 and 7), which in the preferred embodiment is hexagonal, is provided through each of the bracket parts 51 and 52 adjacent the lower end thereof.

Figure 3:
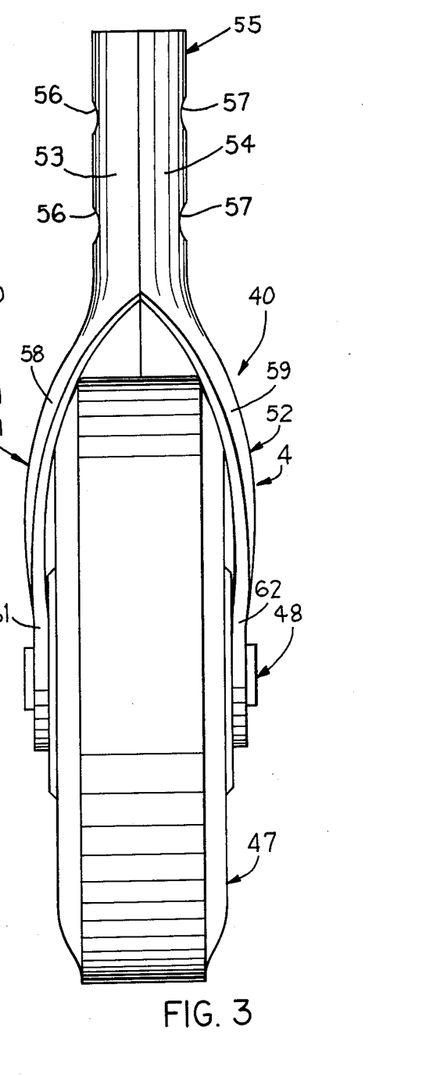
FIG. 3 is a rear elevational view of the wheel bracket assembly of FIG. 1.

As best shown in FIGS. 2 and 3, the bracket parts 51 and 52 are arranged in a mirror image relationship in the wheel bracket assembly 40. The stem portions 53 and 54 are adjacent and the lateral edges thereof engage each other, so that the stem portions 53 and 54 define a substantially cylindrical tube or stem 55. The openings 56 and 57 in the stem portions 53 and 54 are aligned with each other. The central regions 58 and 59 flare downwardly and outwardly away from each other, as best shown in FIG. 3, but the curvature thereof permits the front lateral edges 66 and 67 of the central regions to engage each other along most of their length, as best shown in FIG. 2. As shown in FIGS. 1 and 6, the portions of the central regions 58 and 59 forward of the stem 55 define a smoothly curved, somewhat bulbous front surface 60 which gives the bracket 46 a streamlined appearance and also helps to minimize damage or injury to property or people which the bracket 46 strikes during operational use.

The lower portions 61 and 62 of the bracket parts 51 and 52 are spaced and extend substantially parallel to each other on opposite sides of the wheel 47.

Figure 7:
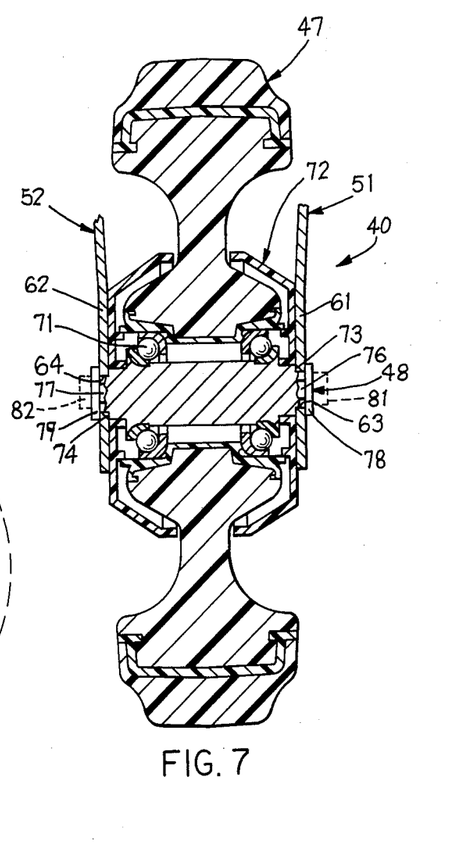
FIG. 7 is a fragmentary sectional front view of the wheel assembly of FIG. 1.

Referring to FIG. 7, dust covers 72 are provided on each side of the wheel 47, and the wheel 47 is rotatably supported on the axle 48 by plural ball bearings 71. The wheel 47 and dust covers 72 are preferably identical to those disclosed in U.S. Pat. No. 4,318,204, the portion of the disclosure of U.S. Pat. No. 4,318,204 relating to the wheel and dust covers thereof being incorporated herein by reference. Accordingly, the wheel 47 and dust covers 72 are not described in detail here.

The axle 48 is a solid axle and is similar to the axle disclosed in U.S. Pat. No. Re. 31,110, the portion of the disclosure of U.S. Pat. No. Re. 31,110 relative to the axle thereof being incorporated herein by reference. The axle 48 has respective axially outwardly facing annular shoulders 73 and 74 adjacent each end thereof which the lower portions 61 and 62 of the bracket parts 51 and 52 engage. Respective shanks 76 and 77 project axially outwardly beyond the shoulders 73 and 74 through the hexagonal openings 63 and 64 in the bracket parts 51 and 52. The outer end of each of the shanks 76 and 77 is upset to keep the bracket parts 51 and 52 in position.

The shanks 76 and 77, prior to creation of the upsets 78 and 79, project outwardly as shown in broken lines at 81 and 82 and have a circular cross section with a diameter slightly less than the minimum cross-sectional dimension of the hexagonal openings 63 and 64. As the upsets 78 and 79 are formed, the material of the shanks 76 and 77 flows to fill the openings 63 and 64, thereby securing the bracket parts 51 and 52 against rotation relative to each other or the axle 48, and thus maintaining them in angular alignment with each other.

A method of fabricating the wheel bracket assembly 40 will now be described.

A metal plate from which the bracket parts 51 and 52 are to be made is placed in a conventional stamping press having a specially formed die therein. A single stamping operation is carried out, which stamps out the two wheel bracket parts 51 and 52, produces the openings 56, 57, 63 and 64 therein, and, due to the shape of the die, simultaneously bends the bracket parts to the required shape.

The bracket parts 51 and 52 are then placed on opposite sides of the wheel 47, the ends 81 and 82 of the circular shanks 76 and 77 projecting through the hexagonal openings 63 and 64 as shown in FIG. 7. The bracket parts 51 and 52 are angularly aligned so that the stem portions 53 and 54 are adjacent and define the cylindrical stem 55, and so that respective openings 56 and 57 in the stem portions 53 and 54 are aligned. The shank ends 81 and 82 are then upset as at 78 and 79, which causes the material of the shanks 76 and 77 to flow and fill the hexagonal openings 63 and 64, so that the wheel bracket parts 51 and 52 are fixed against axial movement and rotational movement relative to each other and to the axle 48.

The wheel bracket assembly 40 is then ready for shipment to a customer. It is unnecessary to provide any further interconnection between the wheel bracket parts 51 and 52 because the shoulders 73 and 74 and the upsets 78 and 79 will keep the bracket parts 51 and 52 from moving axially on the axle 48 and cooperation between the hexagonal shank portions 76 and 77 and the hexagonal openings 63 and 64 will prevent relative rotational movement of the angularly aligned bracket parts 51 and 52. Thus, the customer is provided with an assembly that is convenient to handle and install on a selected device.

The metal plate from which the bracket parts 51 and 52 are stamped is preferably a high carbon steel plate such as type C-1065 and, after the stamping operation, is preferably heat treated and drawn to give it a Rockwell hardness in the range of 45 to 55 Rockwell C and preferably 48 to 52 Rockwell C. This essentially converts the plate to spring steel. The thus increased tensile strength of the steel will enable the steel to withstand substantial shock loads without any plastic deformation.

The wheel bracket assembly 40 is thus relatively simple in structure and can be manufactured in a minimal amount of time with a minimal number of manufacturing steps. Moreover, it is very rugged and durable, particularly in view of the fact that the stem portions 53 and 54 are integral sections of the bracket parts 51 and 52 and thus will not develop play with respect thereto after extended use.

Although the axle shanks 76 and 77 (FIG. 7) are preferably given a hexagonal shape by flow of the material of the axle during formation of the upsets 78 and 79, it will be recognized that the shanks 76 and 77 could alternatively be given an initial shape which has a hexagonal cross section.

FIGS. 8 to 12 illustrate alternative embodiments of the wheel bracket assembly 40 of FIG. 1. Elements which are identical to those in the embodiment of FIG. 1 are designated by the same reference numerals, and elements which are similar are also designated by the same reference numerals but with a suffix "A" through "E" added thereto.

Figures 8, 11, 12:
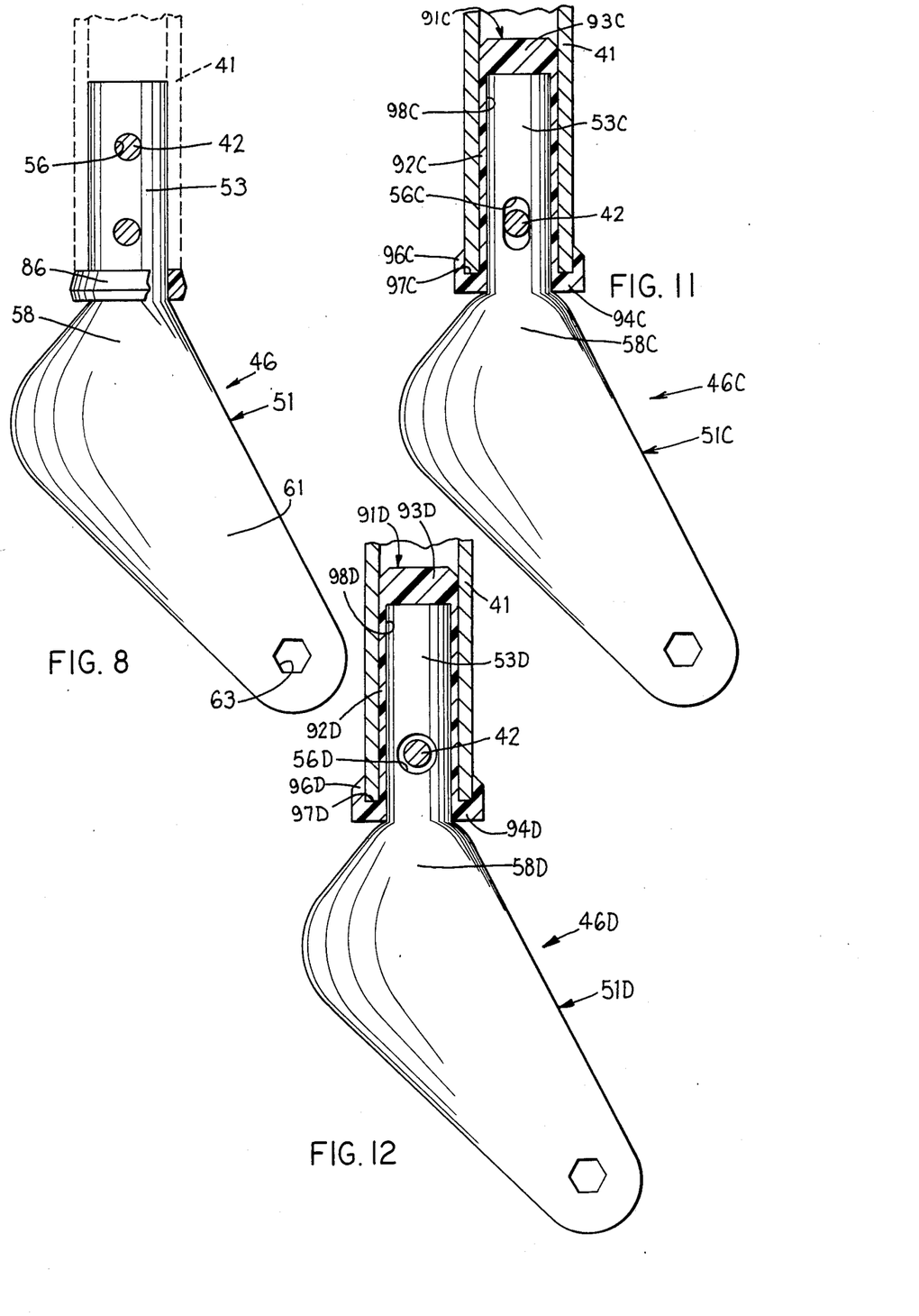
FIG. 8 is a fragmentary elevational side view similar to FIG. 6 of an alternative embodiment of the wheel bracket assembly of FIG. 1.
FIG. 11 is a fragmentary elevational side view similar to FIG. 9 of a further embodiment of the wheel bracket of FIG. 1.
FIG. 12 is a fragmentary elevational side view similar to FIG. 9 of a further embodiment of the wheel bracket assembly of FIG. 1.

The embodiment of FIG. 8 includes a wheel bracket 46 which is identical to the wheel bracket 46 of FIG. 1 and is therefore not described in detail. A circular grommet 86 snugly encircles the cylindrical stem 53 of the bracket 46 at the end thereof adjacent the central region 58. The circular grommet 86 is preferably a molded plastic part and, during manufacture of the wheel bracket assembly, is slid onto the stem 53 after the parts of the bracket 46 have been secured in position by upsetting the ends of the wheel axle. Alternatively, the grommet 86 could be placed over the stem 53 prior to upsetting the ends of the axle in order to maintain the parts of the bracket 46 in proper angular alignment during the upsetting operation. When the stem 53 of this wheel bracket is secured in a tube 41 by rivets 42, the lower end of the tube 41 engages the top surface of the grommet 86.

Figure 9:
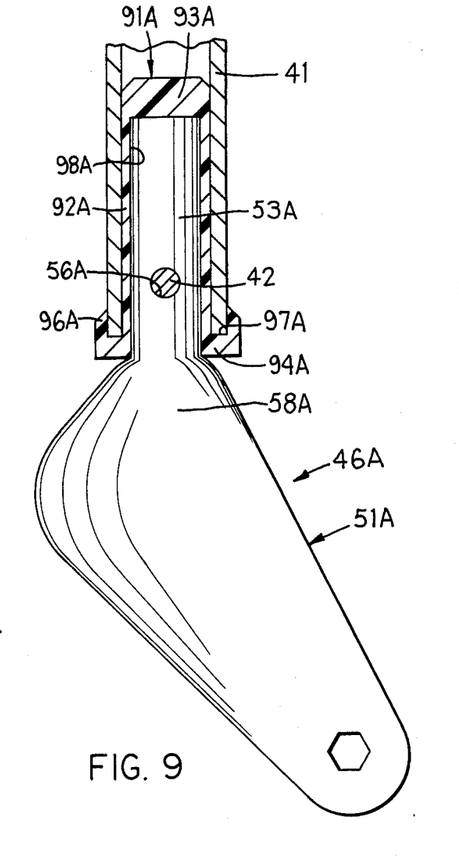
FIG. 9 is a fragmentary elevational side view similar to FIG. 6 of a further embodiment of the wheel bracket FIG. 1.

The alternative embodiment of FIG. 9 includes a wheel bracket 46A which is substantially identical to the wheel bracket 46, except that only one opening 56A is provided in the stem 53A. A boot 91A is provided over the stem 53A and includes a cylindrical sleeve 92A which snugly surrounds the stem 53A, an end wall 93A which closes off the upper end of the sleeve 92A, a radially outwardly extending annular flange 94A which is provided at the lower end of the sleeve 92A, and an annular lip 96A which is provided at the radially outer edge of the flange 94A and extends axially toward the end wall 93A, thereby defining an annular recess 97A. The sleeve 92A snugly surrounds the stem 53A. The outer surface of the stem 53A and the inner surface 98A of the sleeve 92A have cross sections which are substantially constant along the length of the stem 53A and sleeve 92A. The cylindrical sleeve 92A has openings in opposite walls thereof which are aligned with the openings 56A and through which the rivet 42 extends when the wheel bracket is secured in the tube 41, the lower edge of the tube 41 being received in the annular recess 97A.

The boot 91A is made of a moldable synthetic resin material which is somewhat resilient, such as polyurethane having a Durometer hardness value in the range of 75 Shore A to 55 Shore D Durometer, and preferably 80 Shore A Durometer. The resiliency permits the stem 53A of the bracket 46A to pivot slightly within the tube 41 about the axis of the rivet 42 by elastically compressing the material of the boot 91A. This provides a degree a shock-absorbing capability during operational use which helps prolong the life of the bearing of a wheel supported on the bracket 46A.

Figure 10:
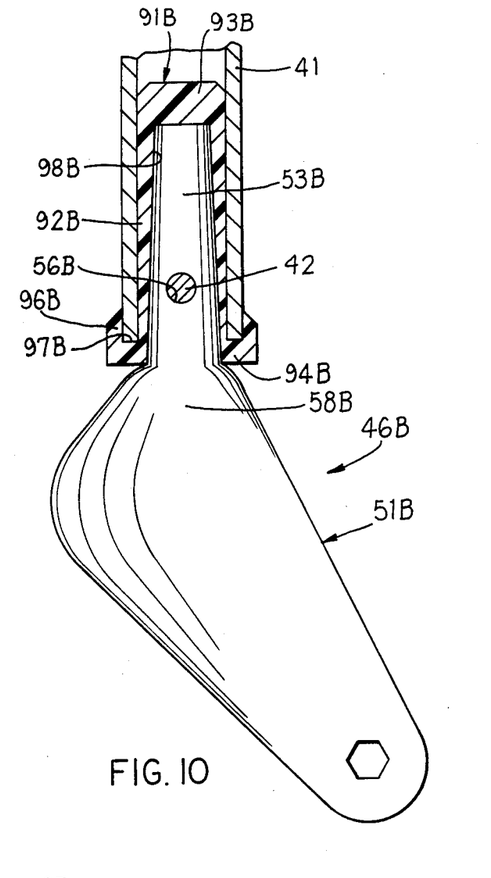
FIG. 10 is a fragmentary elevational side view similar to FIG. 9 of a further embodiment of the wheel bracket assembly FIG. 1.

The embodiment of FIG. 10 is substantially identical to the embodiment of FIG. 9, except that the cross-sections of the stem 53B of the bracket 46B and the internal surface 98B of the sleeve 92B taper upwardly. This provides a slightly larger amount of the resilient material of the boot 91B between the upper end of the stem 53B and the inner surface of the tube 41, thereby permitting a slightly greater amount of limited pivotal movement of the bracket 46B as compared to the embodiment of FIG. 9.

The embodiment of FIG. 11 is substantially identical to the embodiment of FIG. 9, except that the openings 56C in the stem 53C, as well as the openings in the sleeve 92C aligned therewith, are elongate slots which extend lengthwise of the stem 53C and the sleeve 92C and have widths substantially equal to the diameter of the rivet 42. The wheel bracket 46C is thus capable of limited pivotal movement about the axis of the rivet 42 in a manner similar to the embodiment of FIG. 9, and in addition is capable of a small amount of vertical movement relative to the tube 41 and boot 91C, thus improving its shock-absorbing capability. Upward movement of the bracket 46C from the position illustrated in FIG. 11 requires a small amount of elastic deformation of the lower and upper ends of the boot 91C, and the boot 91C will thus tend to return the bracket 46C to the position illustrated in FIG. 11.

The embodiment of FIG. 12 is substantially identical to the embodiment of FIG. 9, except that the openings 56D in the stem 53D, as well as the openings in the sleeve 92D which are aligned therewith, have a diameter somewhat greater than that of the rivet 42. The wheel bracket 46D can thus pivot about the axis of the rivet 42 and move vertically relative to the boot 91D and tube 41, in a manner similar to that described above for the embodiment of FIG. 11. In addition, the wheel bracket 46D is capable of a limited amount of pivotal movement about a vertical axis coincident with the axis of the tube 41 due to the oversized circular openings 56D, thus increasing its shock-absorbing capability.

In addition to the shock-absorbing capability described above, the boots 91A-D of FIGS. 9 through 12 have the further advantage that they permit a given wheel bracket assembly having a stem of a given diameter to be used with a tube 41 which has one of several internal diameters. More specifically, depending on the internal diameter of the particular tube 41 on which the wheel bracket assembly is to be mounted, a boot is selected which has an internal diameter which corresponds to the stem and an external diameter which corresponds to the internal diameter of the selected tube 41. Thus, it is unnecessary to fabricate several expensive sets of stamping dies to make wheel brackets with stems of various diameters, and it is also unnecessary to manufacture and inventory a number of models of wheel brackets which have stems of various diameters. Instead, it is necessary only to manufacture and inventory several boots of different size and only a single version of the completed wheel bracket assembly, which is much more economical.

Figure 13:
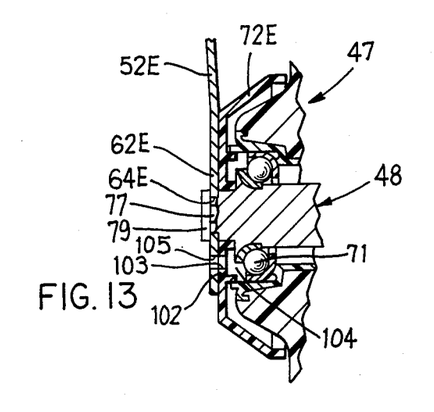
FIG. 13 is a fragmentary sectional view similar to FIG. 6 of a further embodiment of the wheel bracket assembly of FIG. 1.

The modified embodiment according to FIG. 13 is substantially identical to the embodiment of FIG. 7, except that the dust cover 72E has an opening 103 through a region 102 thereof which is spaced radially from the axle 48 and is radially aligned with the annular space 104 in which the bearing arrangement 71 is provided. A small opening 105 is provided through the lower end of the bracket part 52E and is radially spaced from the axle 48 the same distance as the region 102 and opening 103.

It is possible for the dust cover 72E to rotate relative to the bracket part 52E and the axle 48, but frictional engagement of the dust cover 72E with these parts will normally keep it from rotating with the wheel 47 during operational use of the wheel bracket assembly. The dust cover 72E will usually be placed at an angular position relative to the bracket part 52E so that the openings 103 and 105 are not angularly aligned and are thus closed by the inner surface of the bracket part 52E and the outer surface of the dust cover 72E, respectively. If further lubrication of the bearing arrangement 71 should eventually become necessary, the dust cover 72E is manually rotated until the openings 103 and 105 are angularly aligned, then a lubricating substance is injected with a small nozzle through the aligned openings, and then the dust cover 72E is manually rotated relative to the bracket part 52E until the openings 103 and 105 are no longer aligned.

The dust cover 72E is preferably made of plastic, and it will be recognized that the region 102 thereof could be initially manufactured without the opening 103 but in a manner so that the opening 103 can be easily created when needed, for example by inserting an ice pick or similar tool through the opening 105 and using it to pierce the opening 103 through the region 102. In this case, the region 102 can be a circular zone which is concentric to the axle 48 and has a radius equal to the distance from the axis of the axle 48 to the opening 105 in the bracket part 52E.

It will also be recognized that the opening 105 in the bracket part 52E can also be eliminated if the configuration of the bracket part 52E is such that the dust cover 72E can be moved between two angular positions relative to the bracket part 52E, in one of which the region 102 is externally exposed and accessible, and in the other of which the region 102 is disposed against the inner surface of the bracket part 52E. In this case, since the opening 105 is not provided to serve as a guide for piercing the opening 103 at the proper radial location, it is helpful to provide a visible mark on the dust cover 72E to clearly identify the region 102.

Although a particular preferred embodiment of the invention has been disclosed in detail for illustrative purposes, it will be recognized that variations or modifications thereof, including the rearrangement of parts, lie within the scope of the present invention.

The embodiments of the invention in which an exlcusive property or privilege is claimed are defined as follows:

1. A method of making a wheel bracket assembly, comprising the steps of fabricating two separate platelike bracket parts which are substantially mirror images of each other, each having a noncircular opening therethrough; providing an axle having a wheel rotatably supported thereon; placing said bracket parts in mirror image relationship and in angular alignment on opposite sides of said wheel so that each end of said axle extends through said nocircular opening in a respective said bracket part; and upsetting each end of said axle to retain said bracket parts in place on said axle and so that the material of said axle flows to fill said noncircular openings in said bracket parts, thereby preventing relative rotation of said bracket parts about said axle and maintaining said bracket parts in said angular alignment with each other, said bracket parts being free of directly cooperating structure which prevents movement of said bracket parts relative to each other, said bracket parts being connected to each other and held against movement relative to each other solely by said axle.

2. The method according to claim 1, wherein each said bracket part includes first and second portions, said first portion having said noncircular opening therein at a location spaced from said second portion, and wherein said fabricating step includes the step of stamping each said bracket part out of a metal plate, said stamping step bending each said second portion so that said second portions substantially define a tube when placed in said mirror image relationship.

3. The method according to claim 2, wherein each said second portion is bent to a substantially semicylindrical shape, and wherein said second portions are adjacent when placed in said mirror image relationship and define a substantially cylindrical tube.

4. The method according to claim 3, including after said upsetting step the step of placing an annular member onto said substantially cylindrical tube defined by said second portions, the internal diameter of said annular member being substantially equal to the outside diameter of said tube.

5. The method according to claim 4, wherein said annular member is a grommet, and including the step of positioning said grommet at a location on said tube adjacent said first portions of said bracket parts.

6. The method according to claim 4, wherein said stamping step produces an additional opening in said second portion of each said bracket part, wherein said annular member is an elongate sleeve having two aligned further openings in opposite sides thereof, and including the step of aligning each said further opening with a respective said additional opening.

7. The method according to claim 2, wherein said stamping step produces a further opening in said second portion of each said bracket part, said further openings being aligned when said bracket parts are placed in said mirror image relationship.

8. The method according to claim 2, wherein said first portion of each said bracket part includes a first region which is adjacent said second portion thereof and a second region which is remote from said second portion thereof, said stamping step bending said first portion of each said bracket part so that, when said bracket parts are placed in said mirror image relationship, said first regions thereof are flared outwardly away from each other in a direction away from said second portions and said second regions extend approximately parallel to each other.

9. The method according to claim 8, wherein said stamping step is carried out with a single stamping operation.

10. The method according to claim 1, wherein said noncircular opening is substantially hexagonal.

11. The method according to claim 1, wherein said fabricating step includes the step of stamping each said bracket part out of a metal plate; and including following said stamping step the steps of heating and drawing said bracket parts so as to impart thereto a Rockwell hardness in the range of 45 to 55 RC.

12. A wheel bracket assembly, comprising a bracket which includes two separate, platelike bracket parts, each having an opening therein; an axle; a wheel rotatably supported on said axle, said bracket parts being disposed on opposite sides of said wheel and each end of said axle extending through a respective said opening, said bracket parts being angularly aligned and fixed against axial movement relative to said axle; and cooperating means on said bracket parts and axle for preventing relative rotation between said bracket parts and said axle; wherein said axle has means defining a respective axially outwardly facing shoulder adjacent each end thereof, each said bracket part being disposed against a respective said shoulder, and wherein said cooperating means includes said openings in said bracket parts being noncircular, includes an upset at each end of said axle, and includes the material of said axle having flowed to fill said noncircular openings in said bracket parts during creation of said upsets, said bracket parts being free of directly cooperating structure which prevents movement of said bracket parts relative to each other, said bracket parts being connected to each other and held against movement relative to each other solely by said axle.

13. The wheel bracket assembly according to claim 12, wherein said bracket parts are substantially mirror images of each other and each have first and second portions, each said second portion being substantially semicylindrical and said second portions being adjacent each other and defining a substantially cylindrical tube.

14. The wheel bracket assembly according to claim 13, including a further opening in said second portion of each said bracket part, said further openings being aligned with each other.

15. The wheel bracket assembly according to claim 14, wherein said further openings are each an elongate slot extending axially of said cylindrical tube.

16. The wheel bracket assembly according to claim 14, wherein each said first region increases in width in a direction away from said second portion, and wherein each said second region tapers in width in a direction away from said second portion.

17. The wheel bracket assembly according to claim 13, including an elongate tubular sleeve which is made of a resilient material, is provided on and snugly surrounds said tube and has two aligned openings provided in opposite sides thereof, and including an opening provided through said second portion of each said bracket part and aligned with a respective said opening in said sleeve.

18. The wheel bracket assembly according to claim 17, wherein the cross-sections of the outer surface of said sleeve, the outer surface of said tube and the inner surface of said tube sleeve are of substantially constant size and shape along the length of said sleeve.

19. The wheel bracket assembly according to claim 17, wherein the cross-section of the outer surface of said sleeve is substantially constant along the length of said sleeve, and wherein the cross-sections of the outer surface of said tube and the inner surface of said sleeve taper in a direction away from said first portions of said bracket parts.

20. The wheel bracket assembly according to claim 17, including an end wall which closes one end of said sleeve which is remote from said first portions of said bracket parts, a radially outwardly extending annular flange adjacent the end of said sleeve remote from said one end, and an annular lip projecting axially toward said one end of said sleeve from the peripheral edge of said annular flange, said lip being spaced radially from said sleeve.

21. The wheel bracket assembly according to claim 17, wherein said openings in said sleeve and said openings in said tube are each an elongate slot which extends lengthwise of said sleeve and said stem.

22. The wheel bracket assembly according to claim 17, including a frame having a pin which extends through said openings in said sleeve and said openings in said tube, and wherein the dimensions of said openings in said sleeve and said tube are greater than the dimensions of said pin.

23. The wheel bracket assembly according to claim 13, wherein said first portion of each said bracket part includes first and second regions which are respectively adjacent and spaced from said second portion thereof, said first regions being flared outwardly away from each other in a direction away from said second portions and said second regions being spaced from and substantially parallel to each other, each said opening being provided in said second region of a respective said bracket part at a location spaced from said first region thereof.

24. The wheel bracket assembly according to claim 23, wherein the lateral edges of said first regions of said bracket parts are curved inwardly toward each other, a portion of the lateral edges of said first regions on respective said bracket parts butting against each other.

25. The wheel bracket assembly according to claim 23, including a grommet provided on and snugly surrounding said tube at a location adjacent said first regions of said bracket parts.

26. The wheel bracket assembly according to claim 12, wherein said bracket parts are each made from steel plates having a Rockwell hardness in the range of 48–50 RC.

27. The wheel bracket assembly according to claim 12, wherein each said noncircular opening is substantially hexagonal.

28. Teh wheel bracket assembly according to claim 12, including bearing means rotatably supporting said wheel on said axle between said bracket parts, and two dust covers provided on opposite sides of said wheel to protect said bearing means and each slidably engaging a respective said bracket part, each said dust cover being rotatable on said axle relative to said bracket but being normally held against such relative rotation through frictional engagement with said bracket, and one of said dust covers having means defining a region which is approximately radially aligned with said bearing means and is spaced a predetermined distance from said axle, said one dust cover being manually rotatable relative to said bracket part which is associated therewith between a first position in which said region of said dust cover is externally exposed and accessible and a second position in which said region is firmly disposed against an inner surface of said bracket part and external access thereto is obstructed by said bracket part.

29. The wheel bracket assembly of claim 28, including means for facilitating piercing of said region of said one dust cover to produce an opening therethrough, said opening providing external access to said bearing means when said one dust cover is in said first position and being closed by said associated bracket part when said one dust cover is in said second position.

30. The wheel bracket assembly of claim 29, including a pierceable annular zone on said one dust cover which is concentric with respect to said axle, said region being a portion of said annular zone.

31. The wheel bracket assembly of claim 28, wherein said region of said one dust cover has an opening therethrough which provides external access to said bearing means when said one dust cover is in said first position and is closed by said associated bracket part when said one dust cover is in said second position.

32. The wheel bracket assembly of claim 28, including an opening through said associated bracket part, said region of said one dust cover being aligned with and externally accessible through said opening when said one dust cover is in said first position.

* * * * *

UNITED STATES PATENT AND TRADEMARK OFFICE
CERTIFICATE OF CORRECTION

PATENT NO. : 4 759 097

DATED : July 26, 1988

INVENTOR(S) : John W. BLACK

It is certified that error appears in the above-identified patent and that said Letters Patent is hereby corrected as shown below:

Col. 3, line 36; after "wheel" insert ---bracket---.

Col. 3, line 41; after "bracket" insert ---assembly of---.

Col. 3, line 45; after "assembly" insert ---of---.

Col. 3, line 47; after "bracket" insert ---assembly---.

Col. 9, line 24-25; change "exlcusive" to ---exclusive---.

Col. 9, line 35; change "nocircular" to ---noncircular---.

Col. 11, line 6-7; change "Claim 14" to ---Claim 23---.

Col. 11, line 44; change "stem" to ---tube---.

Col. 12, line 19, Change "Teh" to ---The---.

Signed and Sealed this

Fourth Day of April, 1989

*Attest:*

DONALD J. QUIGG

*Attesting Officer*     Commissioner of Patents and Trademarks